(12) United States Patent
Berman et al.

(10) Patent No.: US 7,660,602 B2
(45) Date of Patent: Feb. 9, 2010

(54) FULL-DUPLEX RADIO SPEAKER SYSTEM AND ASSOCIATED METHOD

(75) Inventors: Andrew Berman, Southlake, TX (US); Aaron Kizer, Keller, TX (US)

(73) Assignee: RadioShack Corporation, Fort Worth, TX (US)

( * ) Notice: Subject to any disclaimer, the term of this patent is extended or adjusted under 35 U.S.C. 154(b) by 622 days.

(21) Appl. No.: 11/315,518

(22) Filed: Dec. 22, 2005

(65) Prior Publication Data

US 2007/0149245 A1    Jun. 28, 2007

(51) Int. Cl.
*H04M 1/00*    (2006.01)

(52) U.S. Cl. .................. 455/556.1; 455/3.06; 455/420; 455/41.2

(58) Field of Classification Search ................ 455/41.1, 455/41.2, 557, 569.1, 566.1, 575.2, 550.1, 455/3.06, 3.05, 509, 574, 567, 422.173, 556.1, 455/67.7, 420
See application file for complete search history.

(56) References Cited

U.S. PATENT DOCUMENTS

| | | | | |
|---|---|---|---|---|
| 5,978,689 | A * | 11/1999 | Tuoriniemi et al. | 455/569.1 |
| 7,536,200 | B2 * | 5/2009 | Ashman, Jr. | 455/556.1 |
| 2004/0203351 | A1 * | 10/2004 | Shearer et al. | 455/41.1 |
| 2004/0204168 | A1 * | 10/2004 | Laurila | 455/569.1 |
| 2004/0209654 | A1 * | 10/2004 | Cheung et al. | 455/567 |
| 2005/0026560 | A1 * | 2/2005 | Villaverde et al. | 455/3.06 |
| 2005/0096018 | A1 * | 5/2005 | White et al. | 455/414.1 |
| 2005/0186993 | A1 * | 8/2005 | Yueh | 455/566 |
| 2005/0282592 | A1 * | 12/2005 | Frerking et al. | 455/575.2 |
| 2006/0052141 | A1 * | 3/2006 | Suzuki | 455/569.1 |
| 2006/0060762 | A1 * | 3/2006 | Chan et al. | 250/221 |
| 2006/0079182 | A1 * | 4/2006 | Matsuda | 455/41.2 |
| 2006/0281477 | A1 * | 12/2006 | Downes | 455/509 |
| 2007/0060195 | A1 * | 3/2007 | Hsiang | 455/550.1 |
| 2008/0132294 | A1 * | 6/2008 | Bennett et al. | 455/569.1 |

OTHER PUBLICATIONS

Abe Bluetooth Traveller Speaker, www.abe-hk.com/english/products/8042/8042.htm, date unknown but at least as early as Oct. 20, 2005, In-Tech Electronics Ltd. (HK).

Doss Bluetooth 2.4 GHz Wireless Speakers DS-220, www.dossav.com/english/pro_info.asp?pro_id=47, date unknown but at least as early as Oct. 20, 2005, Wonders Industrial Development/Shen Zhen Co.. Ltd.

* cited by examiner

*Primary Examiner*—Tan Trinh

(57) ABSTRACT

A speaker assembly, and an associated method, is operable in conjunction with operation of a content capable mobile station, such as a mobile station that stores and plays out MP3-formatted files. A Bluetooth™, or other, transceiver of the speaker assembly communicates with a corresponding transceiver of the mobile station. When content is played out by the mobile station, signals representative of the content are communicated to the transceiver of the speaker assembly, and converted into acoustical form. When the mobile station is operated in a telephonic mode, the speaker assembly operates in a full-duplex mode in which hands-free operation is provided to a user by way of the speaker assembly.

11 Claims, 3 Drawing Sheets

FULL-DUPLEX RADIO SPEAKER SYSTEM AND ASSOCIATED METHOD

The present invention relates generally to a stand-alone user interface for a radio electronic device, such as an audio-file-content-capable mobile station. More particularly, the present invention relates to apparatus, and an associated method, that forms a full-duplex radio speaker system, operable in conjunction with the audio-file-content-capable mobile station, or other client device. The apparatus operates alternately in a speaker mode and in a hands-free phone mode.

BACKGROUND OF THE INVENTION

Advancements in technology have permitted the development, production, and sale of many new types of consumer electronic devices. Many types of consumer electronic devices are now available that are capable of processing data at high processing rates and of communicating data at high throughput rates. And, circuit miniaturization permits such devices to be packaged in increasingly smaller housings so as to be portable, such as permitting the devices to be hand carried by a user.

A mobile station is exemplary of a consumer electronic device whose construction and operation has been made possible as a result of advancements in technology. A conventional mobile station, operable in a cellular communication system, is typically of a size and weight permitting a user to carry the mobile station in a shirt pocket, readily available for use by a user to receive or to originate telephonic calls.

Cellular mobile stations are constructed to operate in conformity with operating protocols of an appropriate operating specification. Successive generations of operating specifications have been promulgated, taking advantage of advancements in technologies, in mobile stations constructed to be operable in such successive generations of cellular communication systems. While early-generation cellular communication systems, and mobile stations operable therein, provided voice capabilities and limited data communication capabilities, successor-generation systems increasingly provide for high speed data communication services. New-generation systems, for instance, are capable of communicating significant amounts of data at high data throughput rates.

Digital representations of songs, and other content, for instance, are sometimes relatively lengthy. New-generation cellular communication systems are of capabilities permitting communication of files of sizes corresponding to those of the digital representations. Various mobile stations have been constructed, capable not only of receiving data corresponding to the audio content, but further permitting the storage of the data and its playback at the mobile station. The audio content forms, for instance, MP3-formatted content, and the mobile stations include MP3 players that permit the playback of the content.

When operated in this manner, the playback of the audio content is converted into acoustic form by an acoustic transducer, such as the speaker part of the mobile station. The speaker part of the mobile station, while generally quite adequate for purposes of voice communications, typically is of limited range of operation and output power. The resultant audio quality of audio content, such as a song, is generally relatively poor.

To provide for improved audio quality, external speakers of better acoustic performance are sometimes connected to, or placed in communication connectivity with, the mobile station. The external speakers provide, for instance, increased power output levels, permitting higher volume levels, and improved tonal qualities. The external speakers are provided with the signals generated pursuant to playback of the content file, and the external speakers convert the signals into acoustic form. Other consumer electronic devices that provide for playback of content files also are permitting of use of external speaker sets. And, the external speakers are sometimes paired to form a speaker set, capable of stereophonic operation.

The external speakers are connectable to the mobile station by way of a connecting cable. When the mobile station includes a short-range transceiver, such as a Bluetooth™ transceiver, a corresponding transceiver positioned together with the speakers permits formation of a wireless connection that obviates the need for the connecting cable.

A mobile station capable of playing back stored content and capable of conventional telephonic operation must be capable of operating both in a mode in which the content file is played out and in a mode in which the mobile station operates normally pursuant to telephonic communications. The mobile station must be capable of switching its operation between the separate modes.

For instance, when the mobile station is operated to play out a content file, and, while the content file is playing out, a terminating call is received at the mobile station, the user of the mobile station must be able to switch operation of the mobile station out of the content playback mode and into a normal telephonic mode. A switch or actuation key of the mobile station generally provides for the switching between the separate modes of operation. If the user is positioned proximate to the mobile station, the user is able easily to cause the mode of operation of the mobile station to be switched.

However, if the content is played out on a speaker set that is positioned remote from the mobile station, such as by way of a Bluetooth™ connection between the speaker set and the mobile station, the existing need for a user of the mobile station to move to the mobile station and actuate the actuation key or switch to change the mode of operation of the mobile station, such as to accept the terminating call, might well be inconvenient.

If an improved manner could be provided by which better to permit a remote speaker set to be used in conjunction with a mobile station, improved user convenience of operation would be provided.

It is in light of this background information related to consumer electronic devices that the significant improvements of the present invention have evolved.

SUMMARY OF THE INVENTION

The present invention, accordingly, advantageously provides apparatus, and an associated method, that forms a stand-alone user interface for a radio electronic device, such as a mobile station that is capable of playback of content, such as an audio file.

Through operation of an embodiment of the present invention, a manner is provided that forms a speaker system that operates alternately in a speaker mode and in a hands-free phone mode. When operated in the speaker mode, the speaker system operates to transduce content provided thereto into human perceptible form. Playout of an audio file by way of the speaker system converts the file contents into acoustical form for listening by a user. When operated in the hands-free phone mode, the speaker system forms a full-duplex system permitting the user to communicate, by way of the speaker system, pursuant to telephonic communications carried out by the mobile station with a communication network. When operated in this hands-free mode, at least one acoustic transducer is operated as a microphone and another transducer is operated as a speaker. When so-operated, the user is able to communicate telephonically by way of the speaker system in a wholly hands-free mode when the mobile station is operated pursuant to a telephonic communication service.

In one aspect of the present invention, a wireless transceiver, such as a Bluetooth™, wireless fidelity (WiFi), or ultrawideband (UWB) transceiver, is provided, capable of communicating by way of a radio link with a corresponding transceiver of the mobile station. When Bluetooth™ transceivers are utilized, a Bluetooth™ connection is formed with the mobile station. The transceiver, in turn, is connected to the set of transducers.

In another aspect of the present invention, a selector causes operation in a selected one of the speaker mode and hands-free phone mode. The selection is, for instance, automatically made, responsive to reception at the transceiver of signals communicated by the mobile station. When the signals are of characteristics representative of operation of the mobile station in a content playout mode, selection is made to operate, or continue to operate, in a speaker mode. Conversely, when signals communicated by the mobile station to the transceiver are of characteristics corresponding to operation of the mobile station in a telephonic mode, selection is made to operate, or to continue to operate, in the hands-free phone mode. Alternately, selection is user-implemented, that is to say, a user selects the mode of operation, such as by way of a selection switch or actuator.

When operated in a mode responsive to user selection, the mode of operation is dependent upon the user selection. If the mobile station is operated to play out stored content, and a call is terminated at the mobile station, the mobile station operates in conventional manner, such as to annunciate the terminating call. And, if so configured, to stop the play out of the content to ready the mobile station for operation pursuant to telephonic communications. When the play out of the content is stopped, signals representative of the play out no longer are communicated to the transceiver of the remote assembly. If the user accepts the terminating call, the user evidences the acceptance through normal actuation of the mobile station. And, if hands-free, remote operation is desired, the user further makes the remote selection to operate the speaker system in the hands-free phone mode. Subsequent, telephonic communications are carried out in a hands-free mode in which at least one transducer is operated as a speaker and another transducer is operated as a microphone.

In a further configuration, call acceptance is further carried out remotely, such as by way of user actuation of an appropriate actuator key positioned at the remote assembly. Appropriate communication interfaces are provided to convey the user selection to the mobile station to cause the mobile station, in turn, to accept the call.

Because the remote assembly operates selectably in a speaker mode and in a hands-free phone mode, improved user experience of the capability of the content-capable mobile station is provided.

In these and other aspects, therefore, apparatus, and an associated method, is provided for use in conjunction with an audio-file-capable mobile station. A wireless transceiver is adapted to transceive communication data with the audio-file-capable mobile station. The communication data is of a first mode type when the mobile station operates in a first mode and is of a second mode type when the mobile station operates in a second mode. A transducer set is adapted to receive indications of at least the communication data received by the wireless transceiver. The transducer set is configured to transduce the indication of the communication data between electrical and human perceptible form. A mode selector is adapted to receive an indication of which of the first mode type and the second mode type that the communication data forms. The mode selector is configured to cause correspondent operation of the transducer set in the first mode when the communication data is of the first mode type and operation of the transducer set in the second mode when the communication data is of the second mode type.

A more complete appreciation of the present invention and the scope thereof can be obtained from the accompanying drawings that are briefly summarized below, the following detailed description of the presently-preferred embodiments of the present invention, and the appended claims.

DETAILED DESCRIPTION

Figure 1:
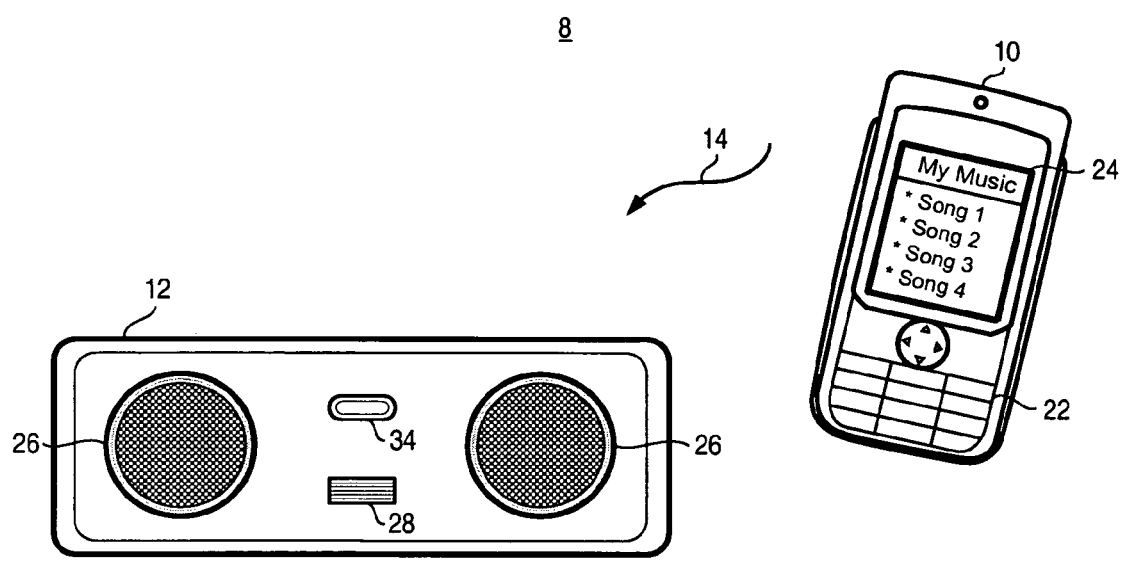
FIG. 1 illustrates a functional block diagram of the apparatus of an embodiment of the present invention positioned together with a content-capable mobile station.

Turning first to FIG. 1, an assembly, shown generally at 8, illustrates a mobile station 10 and a speaker assembly 12 of an embodiment of the present invention. A mobile station and the speaker assembly are connected by way of a radio air interface, here represented by the arrow 14. When the mobile station and the speaker assembly are positioned within communication range of one another, connectivity is provided by way of the radio air interface. That is to say, when the mobile station and speaker assembly are within communication range of one another, communication signals communicated therebetween by way of the radio air interface is carried out pursuant to operation of the speaker assembly 12.

The mobile station 10, in the exemplary implementation, forms a cellular mobile station operable in a cellular communication system. More generally, however, the mobile station is representative of any consumer electronic device that is connectable with a remote communication network by way of a radio, or other, connection. While the following description shall describe exemplary operation of an embodiment of the present invention in conjunction with the exemplary implementation in which the mobile station 10 forms a cellular mobile station, operation of an embodiment of the present invention when used in conjunction with another type of mobile station is analogous.

The mobile station is content-file capable. That is to say, in addition to its operation in conventional manner to provide for telephonic communications, the mobile station further is provided with the capability of receiving and storing digital content, such as audio file content and for playing back, i.e., playing out, the content. The content downloadable to, and storable at, the mobile station comprises, for instance, MP3 files, and the mobile station includes an MP3 player for playing out the MP3 files.

The mobile station, in conventional manner, includes an input keypad 22, and a user display 24. The user display is here shown to display songs that form different MP3 files downloaded and stored at the mobile station. While not separately shown in FIG. 1, the mobile station also includes short range transceiver circuitry, such as a Bluetooth™ or wireless fidelity (WiFi) transceiver, that operates to transceive signals over short ranges with a corresponding transceiver. In another implementation, the short range transceiver circuitry comprises an ultrawideband (UWB) transceiver, such as a wireless USB (Universal Serial Bus) transceiver or a transceiver operable in conformity with the protocols set forth in the IEEE 1394 standard. The Bluetooth™, or other, transceiver circuitry embodied at the mobile station, here is configured in a manner to transceiver signals that otherwise would be provided to, or received from, the speaker and microphone parts (not shown) of the mobile station.

The speaker assembly 12 includes a set of acoustic transducers 26 and a microphone 28. The speakers convert electrical signals provided thereto into acoustic form. And, the microphone 28 also forms an acoustic transducer, operable to transduce acoustic signals into electrical form. The transducers 26 and 28 together define a speaker set, the acoustic transducers of which are connected to a transceiver (not shown in FIG. 1) that is housed within the housing 32 of the speaker assembly. Signals received at the transceiver of the speaker assembly, communicated thereto by the corresponding transceiver of the mobile station, are provided to the speakers 26. And, the electrical signals generated at the microphone 28 are provided to the transceiver embodied within the housing of the speaker assembly for communication to the corresponding transceiver of the mobile station.

The speaker assembly further includes an actuation key, or keys, 34, actuable by a user to control the operation of the speaker assembly in an exemplary embodiment of the present invention. Appropriate actuation of the actuation key causes the speaker assembly to be operated in a speaker mode or a hands-free telephonic mode. The speaker assembly further includes a controller (not shown in FIG. 1) to which indications of the actuation of the actuation key are provided, and responsive to which the controller causes the speaker assembly to be operated in the selected mode.

When operated in a speaker mode, a simplex mode, content played out by the MP3, or other, player of the mobile station is broadcast from the speakers 26 of the speaker assembly. The playout of the content is provided to the transceiver (not shown) of the mobile station, communicated by way of the radio air interface 14, received by the transceiver (not shown in FIG. 1) of the speaker assembly, and then provided to the speakers 26 for conversion into acoustic energy.

When operated in the hands-free mode, a full-duplex mode, the speakers 26 and the microphone 28 are together operable to provide full-duplex communications. Telephonic communication data received at the mobile station, provided to the short range transceiver thereof, communicated by way of the radio air interface, received at the transceiver of the speaker assembly, and provided to the speakers 26 are converted into acoustic form. And, the acoustic energy generated proximate to the microphone 28 is converted into electrical form, provided to the transceiver of the assembly, communicated by way of the radio air interface 16 to the corresponding transceiver of the mobile station for further communication therefrom.

Switching between the modes of operation is carried out, responsive to either user actuation of the actuation key, as noted previously, or automatically, responsive to detection of the type of communication signal provided by the mobile station to the speaker assembly, or upon other command.

The speaker assembly thereby comprises a portable stand-alone speaker system that has, in the exemplary implementation, a set of high fidelity stereo speakers and a microphone. The speaker assembly is enabled wirelessly to play output provided by the mobile station 12, or other digital audio device, by way of a short range, i.e., near field, wireless transceiver. The speaker assembly also is usable as a wireless, external, full-duplex speaker phone further configured, in one implementation, to ring when the mobile station rings to alert a user of a terminating phone call and to switch to hands-free, full-duplex speaker mode operation pursuant to the mobile station operation in a telephonic traffic mode. Because full duplex is provided, voice clipping, that sometimes occurs when half-duplex schemes are utilized, is less likely. The full duplex operation is also available when used in conjunction with a VoIP (Voice over Internet Protocol) application, e.g., SKYPE™, when the mobile station is configured to operate in this manner.

FIG. 2 again illustrates the speaker assembly 12. Here, the elements that form the speaker assembly are functionally represented. The elements of the speaker assembly are implementable in any desired manner, including, in part, by algorithms executable by processing circuitry. Elements of the speaker assembly shown previously in the representation of FIG. 1 are commonly referenced in FIG. 2.

Again, the speaker assembly is shown to include a set of transducers, here including a pair of speakers 26 and a microphone 28. The transducers of the set are connected to a transceiver 44 by way of a driver and switch element 46. And, the transceiver 44 and element 46 are connected to a controller 48. The controller is provided with input signals and commands, including an input signal generated on the line 52, responsive to appropriate actuation of the actuation key 34. Additional input signals used by the controller are provided by the transceiver 44.

Figure 2:
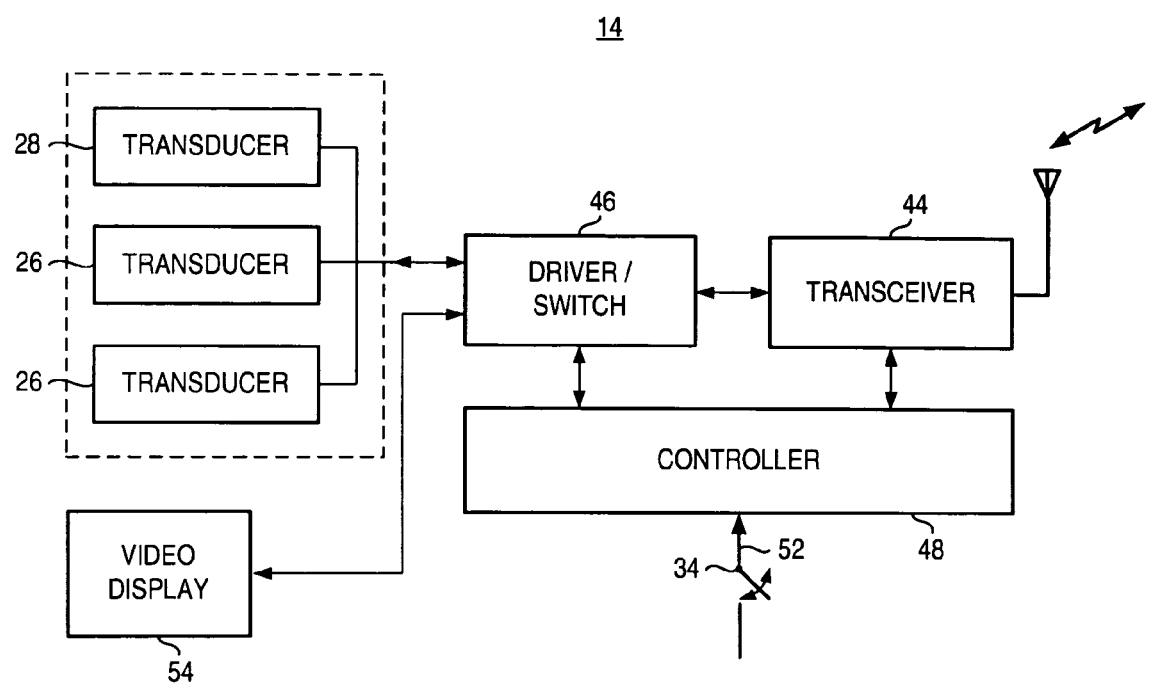
FIG. 2 illustrates a functional block diagram of an embodiment of the present invention.

In the exemplary implementation shown in FIG. 2, the speaker assembly 14 further includes a video display 54, also coupled to the transceiver 44 by way of the driver and switch element 46. The video display operates in exemplary operation of an embodiment of the present invention to generate a video display, available for watching by a user of the speaker assembly. When, for instance, the content file played out by the mobile station includes video content, signals representative of the video content are generated and sent to the transceiver 44 and provided to the video display for display in human perceptible form. Video content is transmittable, for instance, in a new-generation ultra-wide band protocol and transceiver circuitry operable in conformity therewith.

In exemplary operation, the controller 48 controls in which mode that the speaker assembly operates. When stored content is played out by the mobile station (shown in FIG. 1) and signals representative of the playout of the content is delivered, by way of the radio air interface, to the transceiver 44, the controller causes the transducers of the transducer set to be operated as a set of output speakers that convert the receive signals into acoustic form, such as to provide a stereophonic acoustic output. When, conversely, the mobile station (shown in FIG. 1) is operated in a telephonic mode, the controller 48 causes operation of the speaker assembly in a hands-free mode. When operated in a hands-free mode, the controller causes operation of the acoustic transducers in a full-duplex mode in which one of the acoustic transducers operates as a microphone and another of the acoustic transducers operates as a speaker output. Two-way communication, in full-duplex, is provided. The controller switches between modes automatically, or responsive to user input, evidenced by way of actuation of the user actuator 34.

Because the speaker assembly provides both a hands-free user interface for telephonic communications as well as a stereophonic speaker set through which content is played out, increased user acceptance, and use, of the features of the content-capable mobile station is provided.

Figure 3:
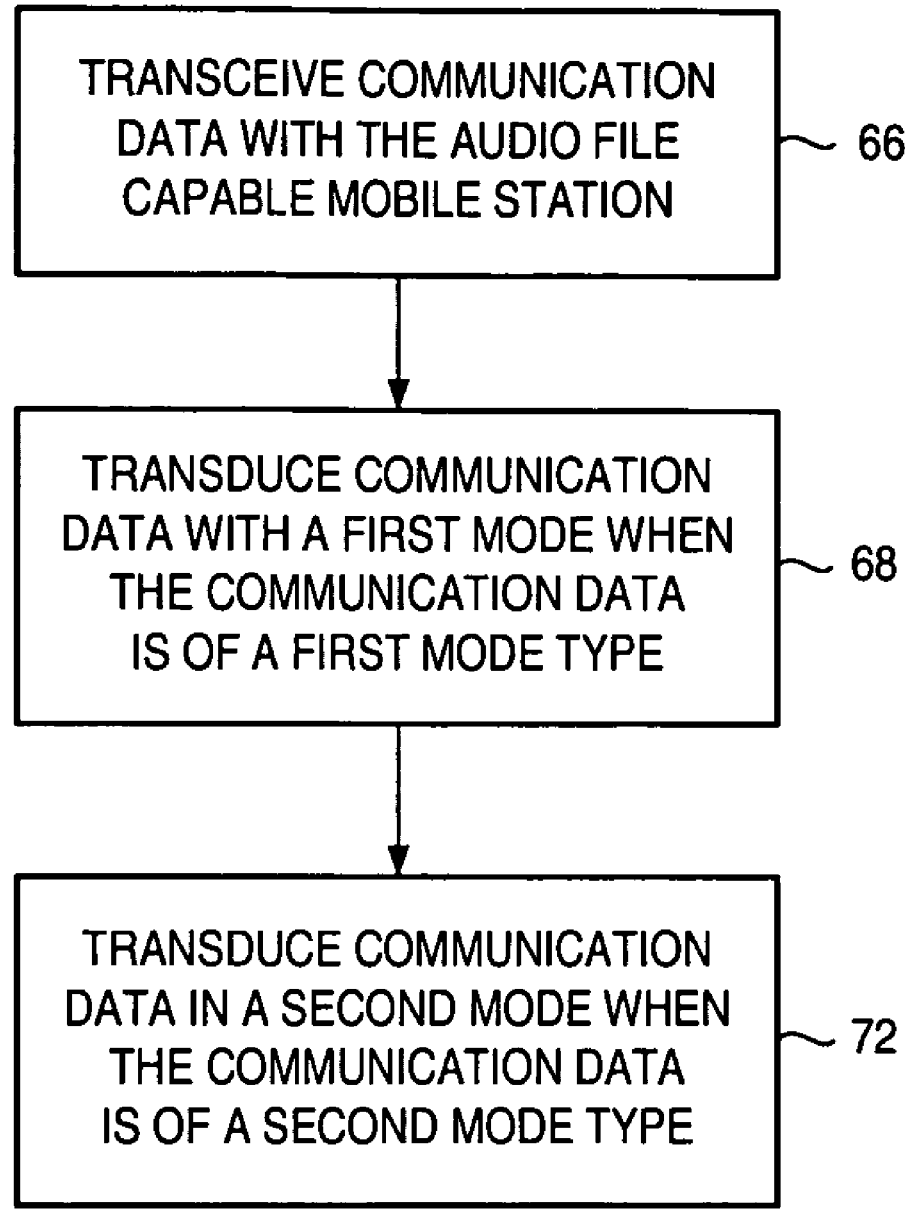
FIG. 3 illustrates a method flow diagram representative of a method of operation of an embodiment of the present invention.

FIG. 3 illustrates a method flow diagram, shown generally at 62, representative of the method of operation of an embodiment of the present invention. The method facilitates user interface with a separately positioned audio file capable mobile station.

First, and as indicated by the block 66, communication data is transceived with the audio file capable mobile station. The communication data is of a first mode type when the mobile station operates in a first mode and is of a second mode type when the mobile station operates in a second mode.

When the communication data is of the first mode type, and as indicated by the block 68, the transducer set is operated to transduce the communication data in a correspondent first mode. And, as indicated by the block 72, when the communication data is of the second mode type, the transducer set is operated to transduce the communication data in a correspondent second mode.

Thereby, through operation of an embodiment of the present invention, operation is dependent upon the communication type of the data that is provided by the audio file capable mobile station. Improved user interface is, as a result, provided.

The previous descriptions are of preferred examples for implementing the invention, and the scope of the invention should not necessarily be limited by this description. The scope of the present invention is defined by the following claims.

What is claimed is:

1. A speaker assembly comprising:
   a set of transducers selectably operable in a speaker mode to transduce received mobile-station audio file-content into acoustic form, and in a hands-free mode to transduce received mobile-station traffic data into acoustic form and to transduce locally-generated data into electrical form, said set of transducers includes a first acoustic transducer, a second acoustic transducer and a visual display transducer; and
   a transceiver coupled to said set of transducers, said transceiver configured to receive the received mobile-station audio-file-content, related video content, and the received mobile-station traffic data and to provide the received mobile-station audio-file content and mobile-station traffic data to said first and second acoustic transducers, to provide received video content when mobile-station audio file-content includes related video content to said visual display transducer, and to receive the locally-generated data, once transduced into electrical form, and to transmit the locally-generated data in electromagnetic form; and
   a selector configured to select in which of the speaker mode and the hands-free mode to operate said set of transducers.

2. Apparatus for use in conjunction with an audio-file-capable mobile station, said apparatus comprising:
   a wireless transceiver adapted to transceive communication data with the audio-file-capable mobile station, the communication data of a first mode type when the mobile station operates in a first mode and of a second mode type when the mobile station operates in a second mode, said first mode including the presenting of audio file content and associated video content and said second mode including speaker phone operation;
   a transducer set adapted to receive indications of at least the communication data received by said wireless transceiver; said transducer set configured to transduce the indications of the communication data between electrical and human perceptible form, and said transducer set comprising a first acoustic transducer, a second acoustic transducer, and a visual display transducer;
   a mode selector adapted to receive an indication of which of the first mode type and the second mode type that the communication data forms, said mode selector configured to cause correspondent operation of said transducer set in the first mode when the communication data is of the first mode type and operation of said transducer set in the second mode when the communication data is of the second mode type.

3. The apparatus of claim 2 wherein said wireless transceiver comprises a Bluetooth™ transceiver and wherein the communication data comprises Bluetooth™ formatted data.

4. The apparatus of claim 2 wherein said wireless transceiver comprises a Wireless Fidelity transceiver and wherein the communication data comprises Wireless Fidelity formatted data.

5. The apparatus of claim 2 wherein the indications of the communication data that is received by said transducer set comprise electrical representations of the communication data.

6. The apparatus of claim 2 wherein both the first acoustic transducer and the second acoustic transducer of said transducer set transduce the indication of the communication data received at said wireless transceiver when the communication data is of the first mode type when the mobile station operates in the first mode.

7. The apparatus of claim 2 wherein the first acoustic transducer of said transducer set transduces the indication of communication data received at said wireless transceiver when the communication data is of the second mode type and the mobile station operates in the second mode, and wherein the second acoustic transducer of said transducer set transduces locally-generated data into electrical form for communication by said wireless transceiver when the communication data is of the second mode type and the mobile station operates in the second mode.

8. The apparatus of claim 7 wherein the first acoustic transducer and the second acoustic transducer operate concurrently when the communication data is of the second mode type.

9. The apparatus of claim 2 wherein said mode selector automatically causes the correspondent operation of said transducer set responsive to reception of the indication of which of the first and second mode types, respectively, that the communication data forms.

10. The apparatus of claim 2 wherein said mode selector is further adapted to receive a user selection, the correspondent operation of said transducer set caused by said mode selector is further responsive to the user selection.

11. The apparatus of claim 2 wherein the first mode type of the communication data for which said wireless transceiver is adapted includes the receiving of audio file content and associated video content and wherein the second mode type of the communication data that said wireless transceiver is adapted to receive comprises voice traffic.

* * * * *